US009322953B2

(12) United States Patent
Narimanov (10) Patent No.: US 9,322,953 B2
(45) Date of Patent: Apr. 26, 2016

(54) ENERGY ABSORBING MATERIALS (75) Inventor: Evgueni E. Narimanov, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 380 days.

(21) Appl. No.: 13/110,422

(22) Filed: May 18, 2011

(65) Prior Publication Data
US 2011/0287218 A1 Nov. 24, 2011

Related U.S. Application Data (60) Provisional application No. 61/345,681, filed on May 18, 2010.

(51) Int. Cl.
B32B 3/00 (2006.01)
G02B 1/00 (2006.01)
G02B 5/00 (2006.01)

(52) U.S. Cl.
CPC .............. *G02B 1/002* (2013.01); *G02B 5/003* (2013.01); *Y10T 428/24355* (2015.01)

(58) Field of Classification Search
CPC .............. G11B 5/3163; G11B 5/3116; G11B 2005/0021; Y10T 29/49043; Y10T 29/49032; Y10T 29/4902; Y10T 29/49021
USPC .......................................... 428/141; 343/909
See application file for complete search history.

(56) References Cited

U.S. PATENT DOCUMENTS

| 7,421,178 | B2 | 9/2008 | Podolskiy et al. |
| 2003/0223721 | A1* | 12/2003 | Povinelli et al. .............. 385/129 |
| 2006/0125681 | A1* | 6/2006 | Smith et al. ................... 342/120 |
| 2009/0268273 | A1* | 10/2009 | Powers et al. ................. 359/288 |

OTHER PUBLICATIONS

Jacob, Z., et al., "Optical Hyperlens: Far-field imaging beyond the diffraction limit," Sep. 4, 2006 / vol. 14, No. 18 / Optics Express, pp. 8247-8256.
Jacob, Z., et al., "Engineering photonic density of states using metamaterials," Appl. Phys. B (2010), May 27, 2010/ Published Online: Jun. 16, 2010, © Springer-Verlag 2010, pp. 215-218.
Korolev, K., et al., "Millimeter-Wave Transmittance and Reflectance Measurement on Pure and Diluted Carbonyl Iron," IEEE Transactions on Instrumentation and Measurement, vol. 59, No. 8, Aug. 2010, pp. 2198-2203.
Landy, N. I., et al., "Perfect Metamaterial Absorber," Physical Review Letters, week ending May 23, 2008, © 2008 The American Physical Society, pp. 207402-1/207402-4.
Narimanov, E.E., et al., "Darker than black: radiation-absorbing metamaterial," 2010 Optical Society of America, 2 pages.

(Continued)

*Primary Examiner* — Laura Auer
(74) *Attorney, Agent, or Firm* — Purdue Research Foundation

(57) ABSTRACT

An indefinite metamaterial where the surface or immediate subsurface region is roughened or disordered has improved coupling of electromagnetic waves incident on the medium. This also means that the amount of energy reflected by the material is reduced. Such a reduction in reflection may reduce the radar observability of a structure with a metamaterial surface, or increase the amount of energy coupled to a detector. An indefinite metamaterial has at least one of the components of the permittivity tensor that is different in sign from the other axes, and in a uniaxial indefinite material this differing axis is oriented perpendicular to the surface of the material. The disorder has scale dimensions of the order of a wavelength and may be random or periodic.

15 Claims, 11 Drawing Sheets (A)

(B)

(56) References Cited

OTHER PUBLICATIONS

Nelson, R. E., "A brief history of thermophotovoltaic development," 2003 IOP Publishing Ltd., obtained at Internet address: http://iopscience.iop.org/0268-1242/18/5/301, 4 pages.

Noginov, M. A., et al., "Bulk photonic metamaterial with hyperbolic dispersion," Applied Physics Letters 94, © 2009 American Institute of Physics, 3 pages.

Pendry, J. B., et al., "Extremely Low Frequency Plasmons in Metallic Mesostructures," © 1996 The American Physical Society, Jun. 17, 1996, vol. 76, No. 25, pp. 4773-4776.

Smolyaninov, I. I., et al., "Metric Signature Transitions in Optical Metamaterials," Physical Review Letters, week ending Aug. 6, 2010, © 2010 The American Physical Society, 4 pages.

Yao, J., et al., "Optical Negative Refraction in Bulk Metamaterials of Nanowires," Aug. 15, 2008, vol. 321 Science, www.science.org, 1 page.

Zhang, J., et al., "A Novel Broadband Metamaterial Resonater with Negative Permittivity," PIERS Proceedings, Xi'an China, Mar. 22-26, 2010, pp. 1346-1348.

\* cited by examiner

ENERGY ABSORBING MATERIALS

This application claims the benefit of U.S. provisional application No. 61/345,681 filed on May 18, 2010, which is incorporated herein by reference.

TECHNICAL FIELD

This application relates to an apparatus and method of enhancing the coupling of electromagnetic waves at or near an interface.

BACKGROUND

Energy-absorbing materials (EAMs) that reduce the amount of reflected electromagnetic energy from their surface have many applications, such as in the stealth technology used to disguise a vehicle or structure from radar detection to foam absorbers in anechoic chambers, solar light energy harvesting in thermal photovoltaics, to infrared sources and detectors. The resulting interest in such systems had lead to the development of many methods and manufacturing techniques to improve the performance of radiation absorbers, such as impedance-matched surfaces in microwave and radar electronics, anti-reflection coatings in optics, and resonance-based metamaterials.

However, despite significant progress in this field over the years, existing methods to reduce reflected radiation are often substantially degraded by damage to the surface due to, for example, exposure to the environment. The resultant surface defects, including moisture adherence, may lead to a significant amount of back-scattered or reflected radiation, with the resulting possibility of detection for a stealth aircraft, performance deterioration for solar collectors or other such performance shortfalls.

In recent years, there have been discoveries in which the response of engineered materials to electromagnetic waves behaves in unanticipated ways. These materials have generally described as metamaterials; however, earlier examples of such materials were termed "artificial dielectrics." Since the field now encompasses engineered aspects of permeability as well as the permittivity, the general term metamaterials has become more conventional to use. A metamaterial may be engineered so as to be strongly anisotropic in one or more of permeability and permittivity and to exhibit well controlled properties that are not available in existing natural materials.

SUMMARY

An indefinite metamaterial exhibiting enhanced electromagnetic coupling and having a relative permeability of about unity is disclosed where a substantially planar interface surface of the material has a surface roughness with a characteristic dimension comparable to about a design wavelength in a direction perpendicular to the surface, and a correlation length of the roughness is smaller than about the design wavelength in a direction parallel to the surface.

The surface roughness may be characterized as having a random component or a periodic component, or a combination of these components.

In an aspect, the negative axis component of permeability tensor may be oriented substantially perpendicular to the coupling surface of the metamaterial. The metamaterial may be designed using conductive inclusions in a dielectric material, where the characteristic size of the conductive structures has at least some dimensions that are small compared with the design wavelength. This structure may be termed a "unit cell" and be fabricated as a plurality of such cells separated by a fraction of a wavelength, or by layers of differing permittivity and having sub-wavelength thickness, arranged so as to achieve an effective permeability at a design wavelength.

In an aspect, an indefinite metamaterial exhibiting enhanced electromagnetic coupling and a permeability of about unity is disclosed, where a permittivity of the metamaterial immediately below a substantially planar interface surface has permittivity variations on the order of a permittivity of free space, and a correlation length of the variations that is smaller than the about the design wavelength in a direction parallel to the surface.

The permittivity variations may be characterized as having a random component or a periodic component, or a combination of these components.

In an aspect, a structure may be manufactured of conventional materials and provided with a surface layer of indefinite material so as to enhance the coupling of electromagnetic energy to the structure. Where the coupling is enhanced, the energy reflected or scattered at the interface of the composite structure is reduced. In this manner, electromagnetic energy, such as from the sun or a radar, or the like may be more efficiently coupled to the structure so as to either absorb the energy, as in radar absorbing materials, or to transfer a larger amount of the incident energy to an energy conversion device such as a solar cell. Where the source of energy is beneath the metamaterial layer, the structure will radiate a larger percentage of the energy through the surface.

Indefinite metamaterials having enhanced electromagnetic coupling may be manufactured by providing a underlayer of indefinite metamaterial and at least roughening the surface of the metamaterial, inducing a disorder in the near-surface portion of the metamaterial, or overlaying the metamaterial with a thin layer of similar metamaterial in which the roughness or disorder is specifically created.

A material that is not an indefinite metamaterial, but has an axis having a substantially different permittivity to the other two axes of the permittivity tensor and having a roughened surface has a similarly enhanced coupling property to that disclosed above.

The terms "substantially" and "about" will be understood by persons of skill in the art as indicating levels of approximation that are useful in designing specific examples of the materials or structures. Such approximations are useful starting points for computations using well known analytic techniques to design materials that have desired function properties within the scope of the techniques that are disclosed herein. More particularly, these terms are intended to convey that is substantial design choice in effecting the metamaterials and structures described herein, depending of the wavelength(s) of operation and application of the materials

BRIEF DESCRIPTION OF THE DRAWINGS

FIG. 4 shows examples of hyperbolic metamaterials: (a) planar metal-dielectric; and (b), (c) metal nanowire composite: (a) is from Z. Jacob, J.-Y. Kim, G. V. Naik, A. Boltasseva, E. E. Narimanov and V. M. Shalaev, "Engineering photonic density of states using metamaterials", App. Phys. B 100, 215 (2010), while (b) and (c) are from J. Yao, Z. Liu, Y. Liu, Y. Wang, C. Sun, G. Bartal, A. Stacy and X. Zhang, "Optical Negative Refraction in Bulk Metamaterials", Science 321, 930 (2008) and M. A. Noginov, Yu. A. Barnakov, G. Zhu, T. Tumkur, H. Li, E. E. Narimanov, "Bulk photonic meta-material with hyperbolic dispersion", Appl. Phys. Lett. 94, 151105 (2009), respectively;

FIG. 7 shows a) the topography profiles of the untreated sample; b) the corrugated (bottom) sample, and, c) the angular reflectance profiles measured on untreated (plots 1, 2) and roughened (plots 3, 4) parts of the same sample in s-polarization (plots 1, 3) and p-polarization (plots 2, 4); the measurement wavelength was 873 nanometers.

DESCRIPTION

Exemplary embodiments may be better understood with reference to the drawings, but these embodiments are not intended to be of a limiting nature. In the following description, specific details are set forth in order to provide a thorough understanding of the present invention which, however, may be practiced without some or all of these specific details. In other instances, well known process operations have not been described in detail in order not to unnecessarily obscure the description.

The phenomenology of electromagnetic radiation interacting with a material can be described by the electromagnetic material parameters $\in$ and $\mu$ where $\in$ is the electric permittivity of the medium, and $\mu$ is the magnetic permeability of the medium and $\in$ and $\mu$ are tensor quantities. When describing a metamaterial in this manner, the parameters represent a macroscopic view of the material response averaged over a scale size of medium that is greater than several of the individual constituent cells of the structure. These materials may be anisotropic, where the sign and magnitude of the individual tensor components may be different in each of the diagonalized axial directions. As used herein the term "indefinite" is intended to broadly refer to an anisotropic medium in which not all of the principal components of the $\in$ and $\mu$ tensors have the same algebraic sign. An anisotropic material may therefore be indefinite; however, not all anisotropic materials are indefinite.

The term "dielectric" as used herein is intended refer to known materials that normally have a relative dielectric constant greater than unity, where a relative dielectric constant of the material is expressed as the ratio of the material permittivity $\in$ to free space permittivity $\in_o$. Many normal dielectrics are solids such as ceramics, mica, glass, plastics and the like; however, liquids and gasses may also exhibit dielectric properties and do not freely conduct an electrical current. The term "conductor" as used herein is intended to refer to materials that provide a useful means for conducting current, such as metals; however, other materials that are semiconductors may also be used. Conductors include, for example, aluminum, copper, gold, and silver. Broadly speaking, there are some materials, such as organic dyes, which do exhibit a refractive index of less than unity in a narrow wavelength band around resonance. However the term dielectric is intended here to refer to "normal" materials. In practice, a dielectric which has a permittivity below unity, is very lossy, so this needs to be considered in the design. Typical broadband dielectrics have permittivities greater than unity, in practice.

When presenting examples, specific structures and methods of fabrication of materials are described so as to better explain the subject matter. The described materials and structures, and methods for making and using such materials and structures, should not be construed as limiting in any way. The disclosed technology is not limited to any specific aspect, feature, or combination of the examples thereof. The disclosed method and apparatus may be used in conjunction with other structures and apparatus, including, but not limited to aircraft or other vehicles, optical systems, photovoltaic systems, or the like. The structure may be formed entirely of a metamaterial or, for example, have a metamaterial applied as a surface treatment. The examples are described at a design wavelength but, as a composite material, the metamaterial may include components that are active at different wavelengths.

The examples are generally simplified so as to improve understanding of the concepts. These structures are shown having a "planar surface" or "substantially planar surface." Such surfaces may include one or more curved, sloped or other deformed portion when incorporated in a larger physical structure; however, the underlying premise is that these large scale deviations do not significantly alter the mode propagation of electromagnetic radiation through the associated metamaterial. However, when the surface perturbations and near-surface perturbations are described we will demonstrate that such wavelength scale and sub-wavelength scale variations may have a significant influence on the coupling of electromagnetic waves across an interface.

As has been mentioned, the behavior of a composite material where the individual cell scale size is substantially less that the wavelength where a measurement is being made may be described, for example, by an effective medium theory that is now well established. As such, the specific design and fabrication approach taken to realize the metamaterials that may be used to construct an apparatus or structure in accordance with the teachings herein is not limited to, for example, rodded structures, or cell like forms, but may encompass any combination of material components that may exhibit the disclosed characteristics and being deployed with the surface characteristics described.

A plurality of layers of materials, which may themselves be composite materials, may be used to form the metamaterial having the desired electromagnetic properties. Generally, such layers will have thicknesses that are substantially less than the design wavelength. Moreover, the metamaterial may have a structure that includes components designed to be effective over a range of wavelengths, and that effective wavelength range may be comprised of either a continuous band of wavelengths or a plurality of separated bands.

Figure 1:
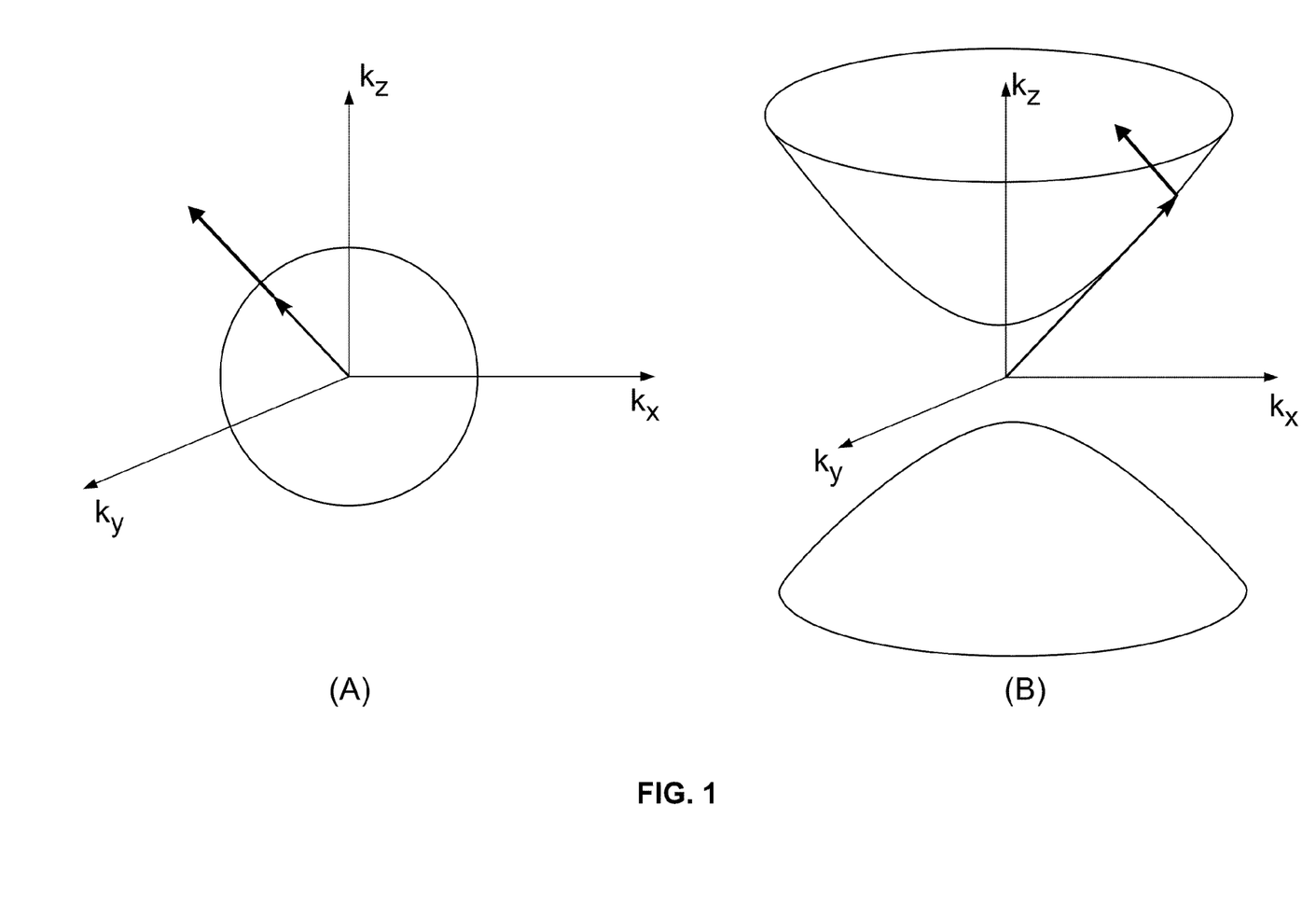
FIG. 1 shows constant frequency surfaces for (a) a dielectric ($\epsilon_x=\epsilon_y=\epsilon_z>0$); and, (b) a uniaxial hyperbolic ($\epsilon_x=\epsilon_y>0$, $\epsilon_z<0$) (meta)material.
Figure 2:
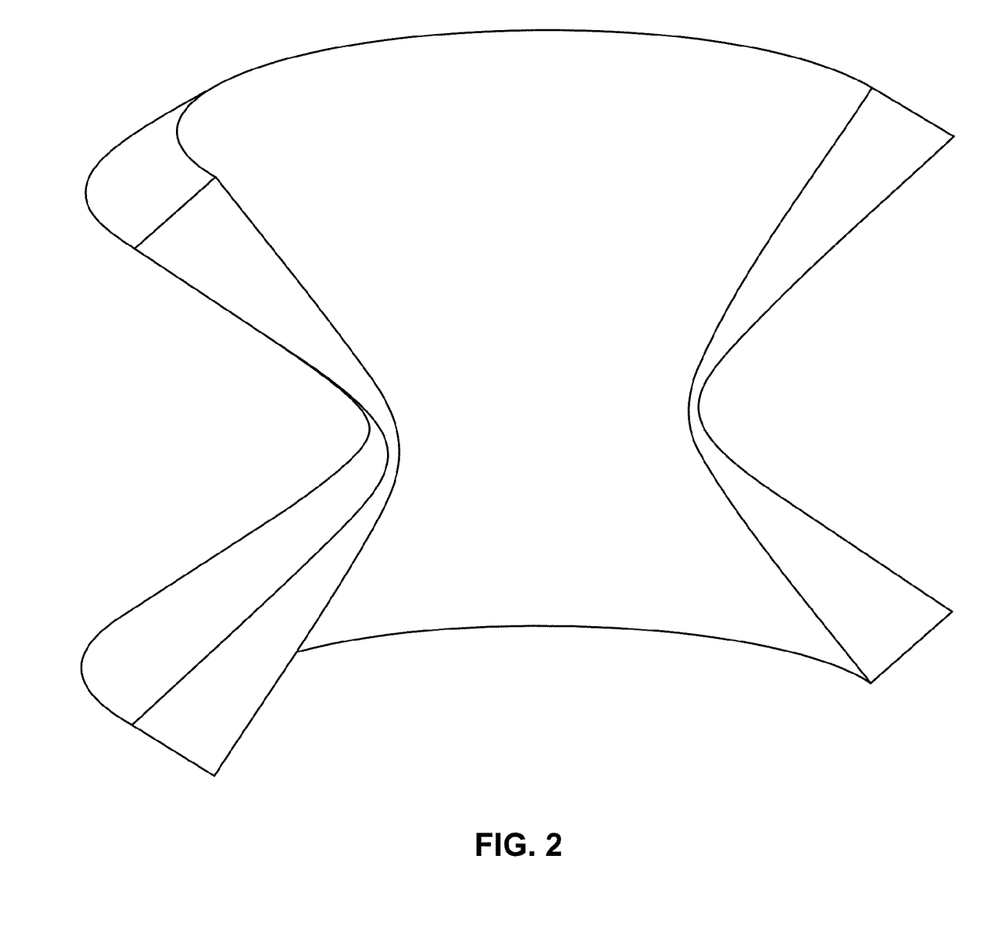
FIG. 2 shows the phase space volume between two constant frequency surfaces for a hyperbolic metamaterial with $\epsilon_x=\epsilon_y<\epsilon_z>0$; the case of a hyperbolic metamaterial with $\epsilon_x=\epsilon_y>0$, $\epsilon_z<0$ (see FIG. 1b) will produce a similar result, with an infinite phase space volume between two hyperbolic surfaces.

The concept of an indefinite metamaterial (also called "hyperbolic metamaterial") to overcome the diffraction limit of optical imaging was previously disclosed by the present inventor and other collaborators. Hyperbolic metamaterials exhibit a number of novel characteristics resulting from singularities in the behavior of the density of photonic states. The nature of this super-singularity in hyperbolic metamaterials can be understood from a visual representation of the density of states in the effective medium limit in terms of the phase space volume enclosed by two surfaces corresponding to different values of wavelength (FIG. 2a). For extraordinary waves in a uniaxial dielectric material ($\epsilon_x = \epsilon_y \neq \epsilon_z$) having $\mu = 1$, the dispersion law $$\frac{k_z^2}{\epsilon_x} + \frac{k_x^2 + k_y^2}{\epsilon_z} = \frac{\omega^2}{c^2} \quad (1)$$

describes an ellipsoid in the wave momentum (k-) space, which reduces to a sphere if $\epsilon_x = \epsilon_y = \epsilon_z$: see FIG. 1a. However, when at least one of the components of the dielectric permittivity tensor is negative, such as in an indefinite material, (1) describes a hyperboloid in phase space (FIG. 1(b)). It should be emphasized that the use of a uniaxial material as an example is done for clarity in exposition, and there is no reason to restrict the metamaterials in that manner in actual applications. Where the dispersion law is evaluated for a pair of wavelengths for FIG. 1a, the phase-space volume enclosed between two such surfaces is finite, corresponding to a finite density of photonic states.

However, when such a computation is performed for the hyperbolic situation of FIG. 1b, it is evident that the phase-space volume between two such hyperboloids (corresponding to different values of wavelength) is infinite, leading to an infinite density of photonic states in the effective medium limit.

The theoretically optimum case, where the interface of the metamaterial is with air, would be $\epsilon_x = \epsilon_y = 1$, $\epsilon_z < 0$, $|\epsilon_z| \gg 1$.

In general, uniaxial hyperbolic materials are characterized by $\epsilon_x > 0$, $\epsilon_y > 0$, $\epsilon_z < 0$, and for an air interface, with $|\epsilon_x|$ and $|\epsilon_y|$ of order 1, while $|\epsilon_z| \gg 1$. Other strongly anisotropic materials may also exhibit a sufficiently large number of states so as to be effective in coupling energy in accordance with the concepts disclosed herein, such as, $\epsilon_x > 0$, $\epsilon_y > 0$, $\epsilon_z > 0$, where, $\epsilon_z \gg 1$.

While there are a number of mechanisms that may result in a singularity in the density of photonic states, the present situation is distinguished as it leads to an infinite value of the density of states for every frequency where different components of the dielectric permittivity have opposite signs at a location in the material. (Where the term infinite is used, it is meant to represent a very large number as compared with the situation in conventional materials.) It is this behavior, which underlies a specific characteristic of a particular configuration of hyperbolic metamaterials that are described herein. In particular, the broadband singularity of the density of states may lead to a dramatic enhancement of the electromagnetic transmission arising from defects or surface corrugations at the interface of the hyperbolic metamaterial, with nearly all the incident light "sucked" into the propagating modes of the hyperbolic medium.

Other parametric values for the permittivity, where the properties of the medium are strongly anisotropic, but not indefinite, where the medium has, for example, the in-plane dielectric permittivities nominally equal to the permittivity of the surrounding medium, and a large positive permittivity in the direction substantially perpendicular to the surface, may also exhibit a large density of states. While the density of states may not be formally infinite, the coupling properties may also be effective in practice.

The density of states is to be understood as being achieved in the effective medium limit. For computational purposes, the effective medium limit neglects the finite size of the unit cell of the metamaterial. The density of states in a metamaterial scales as cubic power of the ratio of the free-space wavelength to the cell size (in the case where the dielectric permittivities substantially depend on frequency) or the square of the ratio of the free-space wavelength to the cell (if the frequency dependence of dielectric permittivities is negligible). In both of these cases, as the cell size goes to zero, the density of states goes to infinity. For an actual metamaterial, based on for example, conductive inclusions of various forms in a dielectric material, the density of states is finite but very large. For a metamaterial designed for an optical wavelength in the visible range, having a cell size on the order of 50 nanometers, the density of states is enhanced by a factor of the order of a thousand; and, for metamaterial designed for microwave frequencies and a cell size on the order of a millimeter, the density of states is enhanced by a factor of the order of a hundred thousand.

Some insight into the guiding properties of the metamaterial with the described characteristics may be obtained by considering that the Poynting vector, representing the power flow, is orthogonal to the surface of the phase space at a wavelength. The Poynting vector is seen to be collinear with the phase vector in the situation of FIG. 1a, where the medium is isotropic, whereas, in FIG. 1b, the Poynting vector and the phase vector are not collinear. In the example shown, power arising from a large portion of the phase space is directed generally with a component along the z axis. In a particular medium, the path of the energy within the metamaterial may be computed using semi-classical techniques such as ray tracing. This approach may be used where the metamaterial is configured for operating over a band of wavelengths, or at one or more specific wavelengths, and the composite behavior is to be estimated.

While disorder in the material (e.g., localized inhomogeneities either at the interface or within the material) may change the magnitude of the permittivity components, leading to a deformation of the corresponding hyperboloid in the phase (momentum) space, the surface will remain a hyperboloid and will therefore still support an effectively infinite density of states. As a result, unless the disorder is severe enough as to completely collapse the hyperbolic surface of constant frequency, the fundamental properties of the materials system and the performance described herein will be preserved.

Figure 3:
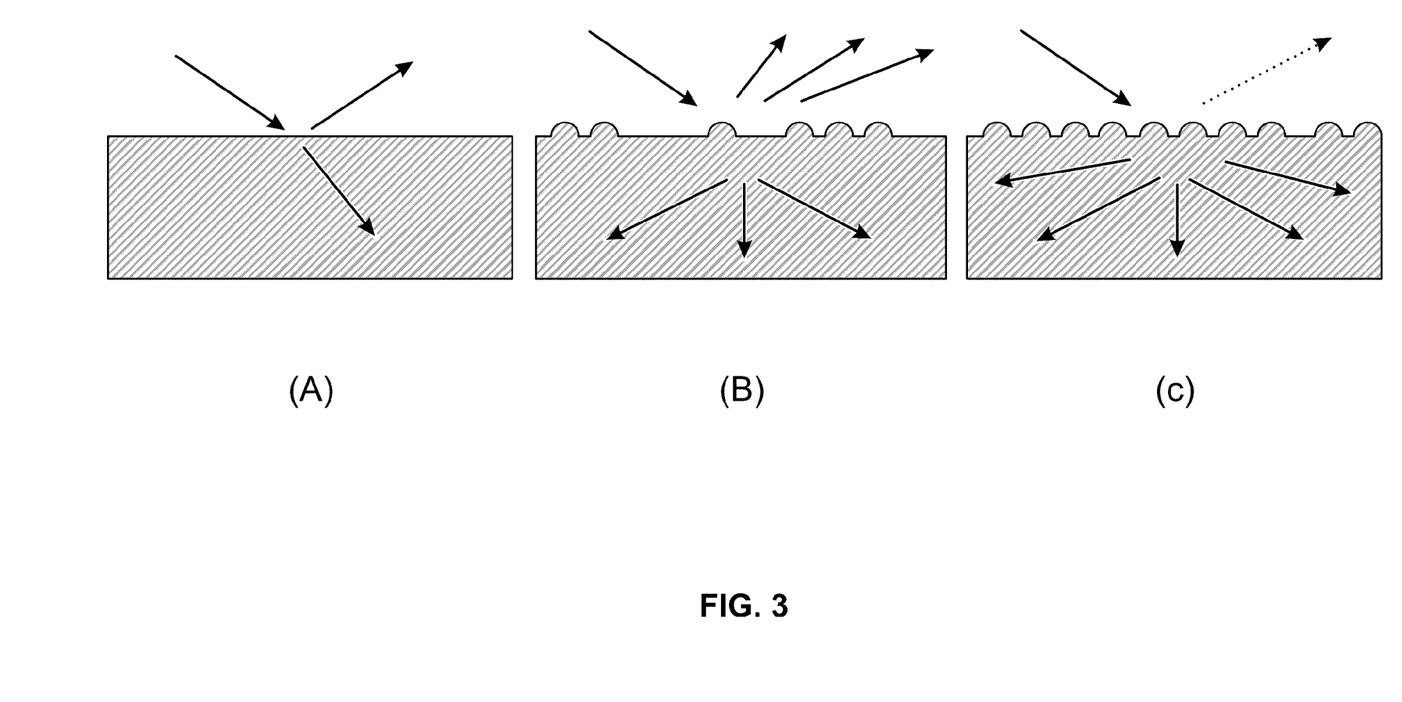
FIG. 3 is a qualitative schematic representation of electromagnetic reflection, refraction and scattering for (a) material (either dielectric and hyperbolic) with no disorder at or near a substantially planar boundary; (b) a dielectric with surface disorder; and, (c) a hyperbolic (meta)material with surface disorder.

Light (or any other wavelength of electromagnetic radiation for which the material is designed to be effective) incident upon a substantially planar surface of a material is generally partially refracted into the medium, partially (specularly) reflected (see FIG. 3a), and partially scattered, both into the medium and into the surrounding space (see FIG. 3b). The scattered radiation typically originates from surface or close-to-the surface defects and disorder. In the absence of such defects, suppression of reflected radiation has been previously addressed by impedance matching between the material and the external medium. The performance of such impedance-matched systems may severely deteriorate when the actual use thereof results in some degree of surface damage, such as due to environmental degradation.

In an aspect, consider the case where a substantial disorder is introduced at or near the surface of the radiation-absorbing material, with resulting increase of the scattering. The scattered intensity value can be calculated using the Fermi Golden Rule, where the scattering rate $W_{k \to k'}$ is proportional to the (photonic) density of (scattered) states at the operating frequency $\rho(\omega)$:

$$W_{k \to k'} \propto \rho(\omega) \delta(\omega_k - \omega_{k'}) \quad (2)$$

When a super-singularity (or at least, a very large number of such states) is present in the density of photonic states in the metamaterial, the energy scattering into the medium will be strongly enhanced and due to the principle of conservation of total energy; this enhancement occurs at the expense of the reflected energy (in specular and diffuse components). Therefore, contrary to intuitive expectations, introducing disorder (such as, surface corrugations, surface roughness, material density or permittivity variations, or the like) at or near the otherwise substantially planar surface of a hyperbolic metamaterial dramatically reduces the total-energy reflection, including the diffuse component (FIG. 3c).

The design and fabrication of metamaterial structures is a very active development field, and includes hyperbolic metamaterials, which have been used, for example, in the field of optical imaging. One approach to creating a (meta)material having hyperbolic dispersion or strongly anisotropic properties uses at least two physical material components that are combined on a scale size such that metamaterial properties are observed at a desired wavelength: one material may have a conventional dielectric permittivity (for example, a regular dielectric such as a plastic, glass, alumina or the like) and the other material may have a negative permittivity (such as a conductor below the plasma frequency or a polaritonic material in the restrahlen band, such as, e.g. silicon carbide near the wavelength of 10 micrometers), assembled as a composite material having an anisotropic configuration. Such materials may also be inhomogeneous on a macro scale, so that the electromagnetic properties may be a function of the coordinates both on the surface of and within the material.

Figure 4A:
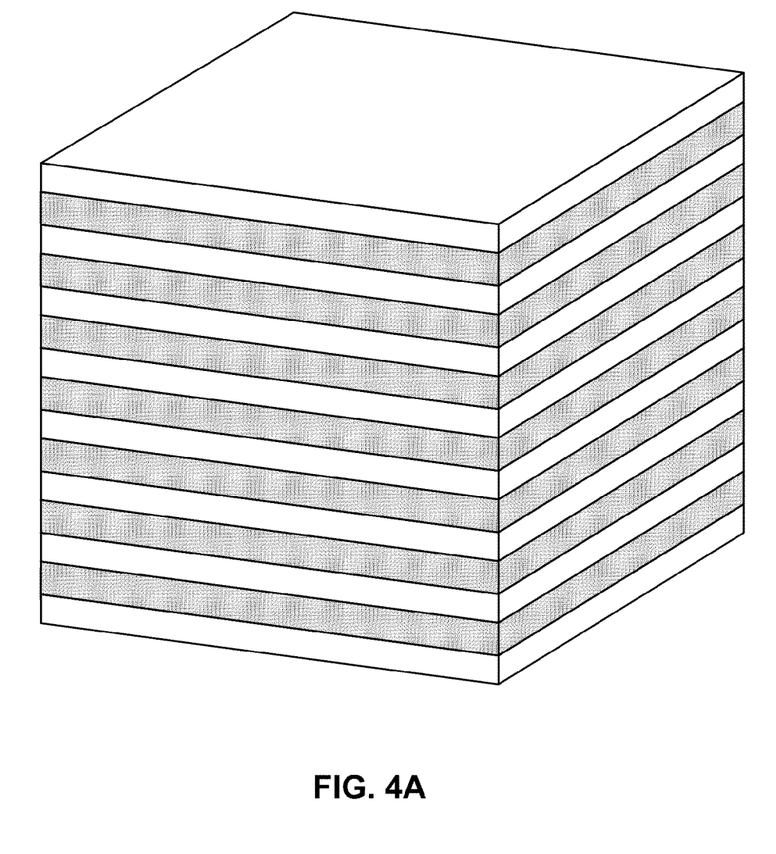
Figure 4B:
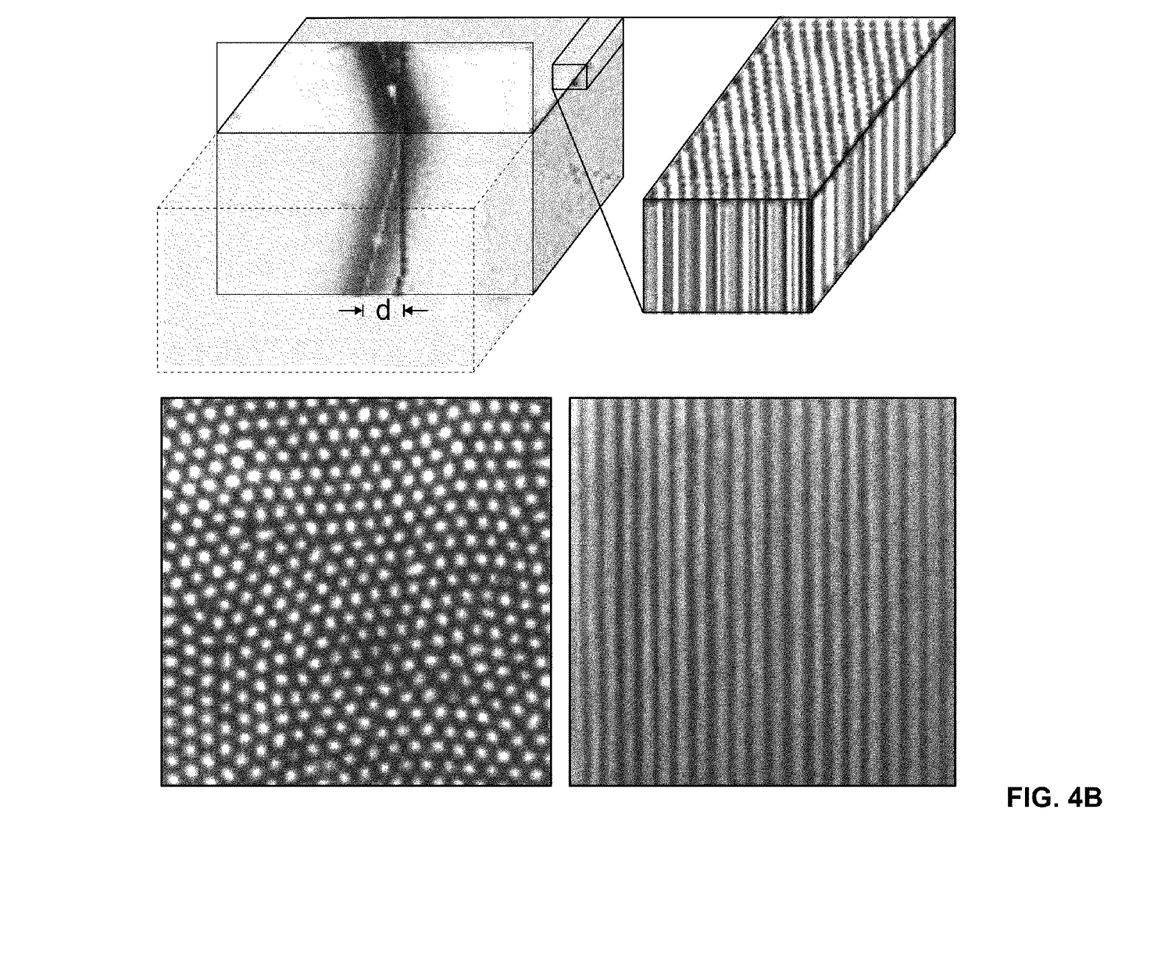
Figure 4C:
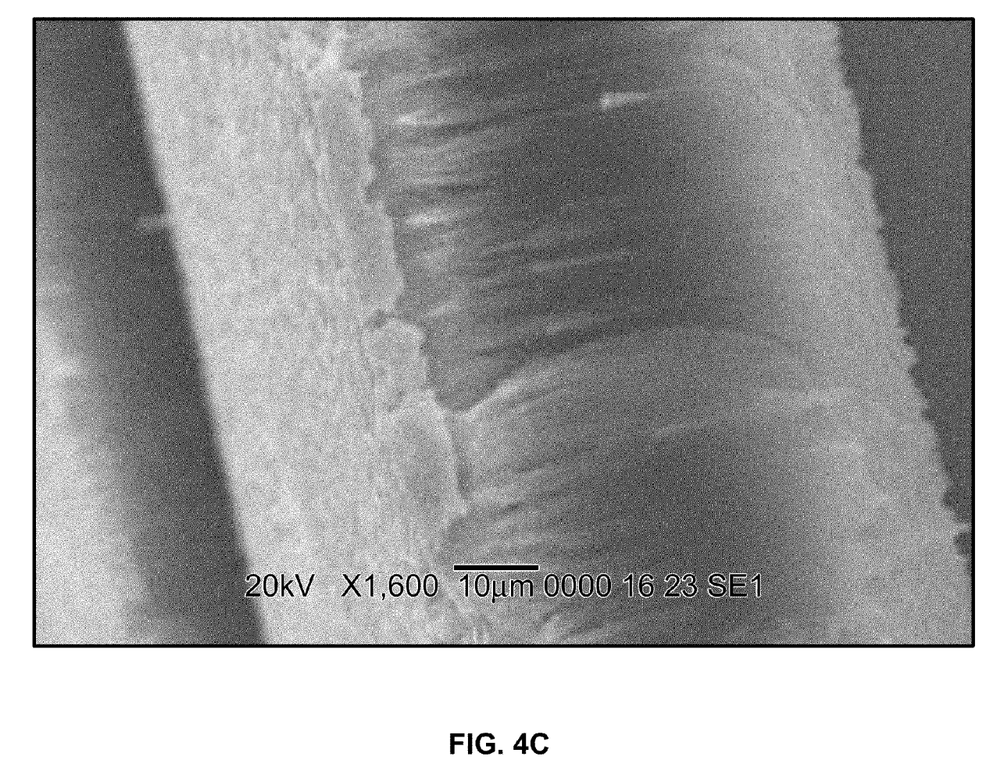

In an aspect, the metamaterial may be a dielectric material with conductive materials of an appropriate size, shape and spacing embedded therein. Simple practical examples of such metamaterials include layered structures (see FIG. 4a) and (nano)wire composites (see FIG. 4b, c).

The smaller the design wavelength, the smaller the scale size of the "unit cell" of the metamaterial that would be fabricated: in an aspect, for GHz one would pattern the system on the scale of a millimeter, whereas for optical wavelengths this scale size reduces to tens of nanometers, which may use more specialized fabrication techniques. However, as such scale sizes of materials features are already common in semiconductor devices and other nanostructures, the fabrication technology is mature enough to produce a variety of optical hyperbolic or anisotropic metamaterials. Many examples of specifically designed and fabricated metamaterials may be found in the scientific literature. Consequently, any similar "scaled-up" fabrication process for operation at lower frequencies (from infra-red (IR) down to GHz and RF) is more straightforward and many such metamaterials have also been fabricated. A person of skill in the art will be able to fabricate both optical materials and lower frequency materials in accordance with these teachings.

For example, it well known that a (meta)material fabricated with a plurality of parallel wires having a wire-to-wire separation on the order of a millimeter, (e.g., similar to FIG. 4b) exhibits a strongly anisotropic electromagnetic response for GHz frequencies, with the negative dielectric permittivity in the directions along the nanowire:

$$\epsilon_\parallel \approx 1 - \frac{\omega_p^2}{\omega(\omega + i 0.1 \omega_p)}$$

where $\omega_p$ is the plasma frequency and $\omega$ is the radian frequency. For example, in 1996, J. Pendry and collaborators demonstrated that an array of aluminum wires separated by the distance of 5 millimeters in a dielectric matrix (which may be air or another conventional dielectric material), shows a hyperbolic response for frequencies below about 8.2 GHz. The restrictive dimensions taught by Pendry are not generally necessary, and others have shown examples of wire lattices comprising continuous or noncontinuous wires that have a permittivity with the same analytic form.

Figure 5:
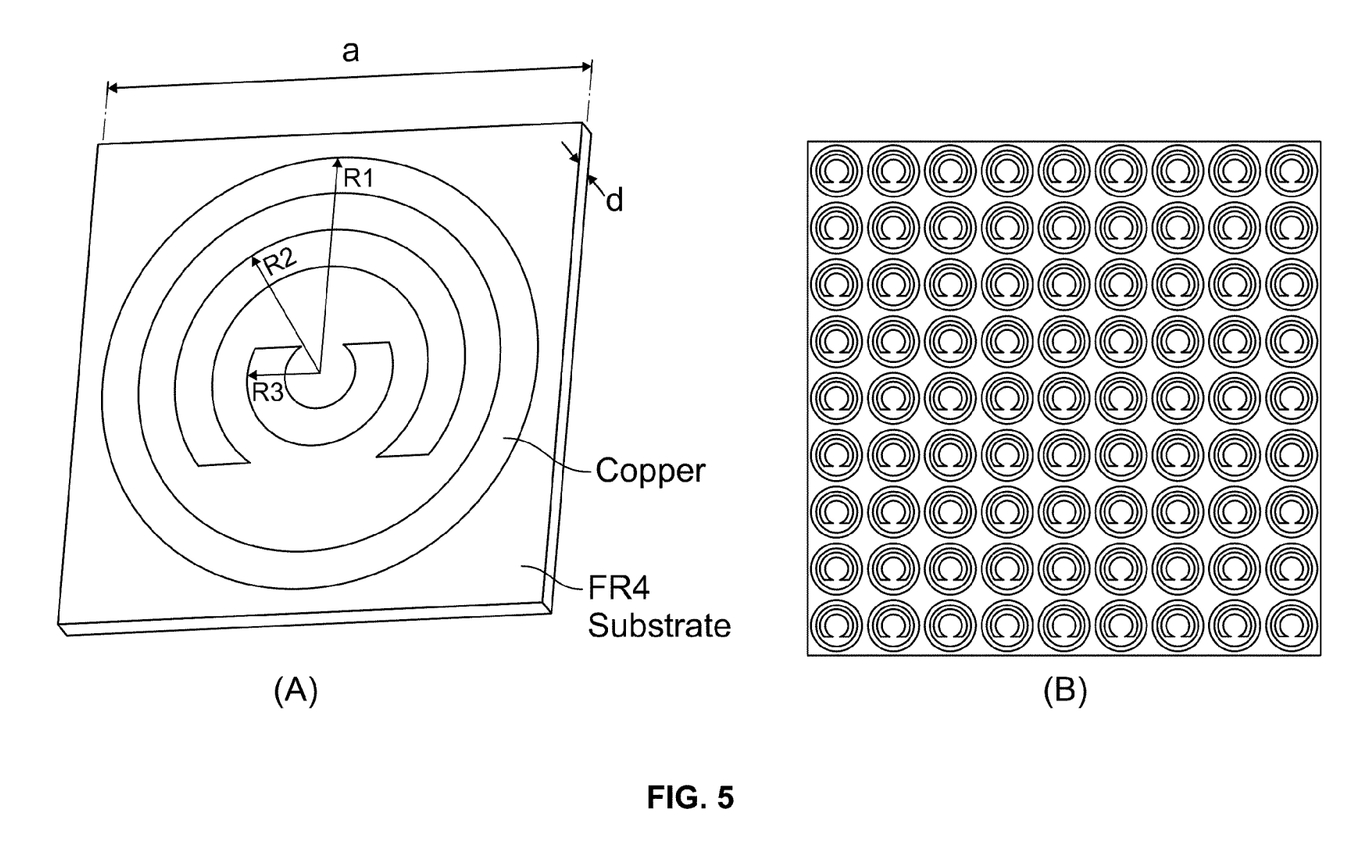
FIG. 5 shows a) a planar unit cell; and, b) a single layer of the metamaterial formed by a plurality of unit cells (dimensions of the unit cell are: a≈3 mm, d=0.203 mm, $R_1$=1.5 mm, $R_2$=1.0 mm, and $R_3$=0.5 mm): from J. Zhang and Z. R. Hu, "A Novel Broadband Metamaterial Resonator with Negative Permittivity", Proceedings PIERS (Xi'an, China, March 22-26), 1346-1348 (2010)

Introducing a more complicated pattern of metallic elements allows further control of the hyperbolic response. For example, at GHz frequencies a metamaterial based coupled-ring-split-ring resonator of the type illustrated in FIG. 5 exhibits hyperbolic response between the frequencies of 21.2 GHz and 32 GHz (negative dielectric permittivity in the direction perpendicular to the resonator layers, and positive permittivity parallel to the layers). In a structure intended to strongly absorb (or emit) radiation, an axis of negative permittivity is oriented substantially perpendicular to the surface through which the energy is to be absorbed (emitted).

There are also some natural materials, which exhibit hyperbolic dispersion at some frequency range (e.g., bismuth, sapphire, silicon carbide and graphite in infrared part of the optical spectrum). Bismuth shows hyperbolic response in the wavelength interval from 54 to 63 micrometers, where the preferred axis of negative permittivity is the trigonal axis; sapphire shows the hyperbolic dispersion near the wavelength of 20 micrometers with the preferred axis of negative permittivity along the monoclinic crystallographic c-axis; the wavelength interval of the hyperbolic dispersion and the direction of the preferred axis of negative permittivity in the silicon carbide depend on the polytype of this compound (different polytypes correspond to the different size of the unit cells of this compound); graphite shows the hyperbolic response below the wavelength of 280 nanometers, with the negative permittivity perpendicular to the c-axis. These materials may be used alone or in a metamaterial.

Figure 6:
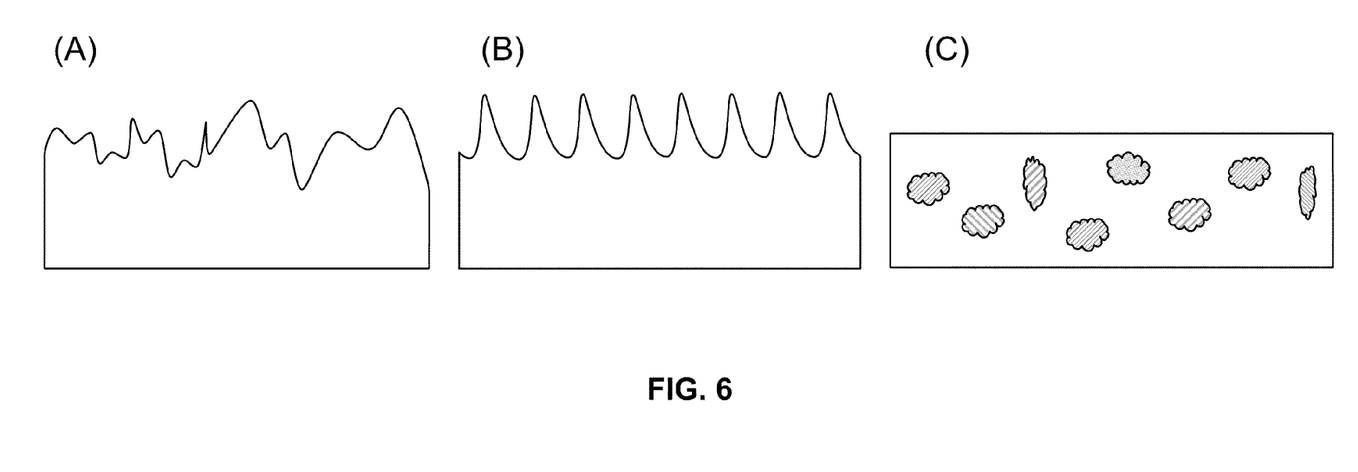
FIG. 6 shows schematic examples of defects introduced either at the surface a) and b); or, c) just below the surface of the hyperbolic metamaterial.

As mentioned above, a hyperbolic metamaterial may be converted into an efficient EAM, by introducing surface roughness or distortions, which may be random or ordered, at or near the metamaterial surface. The actual realization of such defects could involve (i) random roughness (see FIG. 6a), (ii) periodic surface corrugations (FIG. 6b), (iii) random and/or periodic variations in the composition of the hyperbolic metamaterial (FIG. 6(c)), or any combination thereof. The sub-wavelength scale of the induced periodic variations (in the case of a periodic distortion) or sub-wavelength correlation distance of the disorder (in the case of random or quasi-random distortions) effects the coupling to the high-k waves in the hyperbolic metamaterial.

Often it is helpful to express the material characterization by an analytic model for the estimation of performance and comparison with experiment. The choice of model is not intended to suggest that other models would not be useful or usable in order to perform design activities in accordance with the general principles disclosed herein.

Quantitatively, the degree of the (near-) surface disorder can be characterized, for example, by the correlation function of either the surface roughness:

$$C_h(\delta\rho) = \langle h(\rho + \delta\rho) h(\rho) \rangle \quad (4)$$

Or, the dielectric permittivity:

$$C_\in(\delta r) = \langle ((\in(r+\delta r) - \langle\in\rangle) \cdot (\in(r) - \langle\in\rangle) \rangle \quad (5)$$

Here, $\rho \equiv (x, y)$ is a two-dimensional vector representing the position on the surface and r is the radius-vector within a nominal volume, and the brackets $\langle \rangle$ represent the spatial average (over $\rho$ and r respectively). These correlation functions can be characterized by two parameters: the amplitudes ($h_0$ for surface corrugations and $\Delta \in$ for bulk disorder) and the correlation length L of the disorder. While the former represents the (typical) magnitude of the deviations from the average, the latter shows the typical distance over which such deviations do not significantly change. For surface corrugations, the ratio of $h_0$ to L corresponds to a (typical) slope of the surface being characterized.

For the efficient operation of the hyperbolic EAMs at least one of the one the following conditions should be satisfied:
(i) the dimensionless amplitude of the disorder ($h_0/\lambda$ for the surface corrugations, where $\lambda$ is the wavelength, and $\Delta\in/\in_0$ for the bulk disorder) should be on the order of unity or higher, and
(ii) the correlation length L should be substantially smaller than the free wavelength $\lambda$, with the smaller values of L generally leading to lower reflection. However, the correlation length L should not be reduced to the point below the metamaterial cell size, when using this model.

The positive component(s) of the magnitude of the dielectric permittivity components of the hyperbolic metamaterial may be close to the dielectric permittivity of the surrounding medium, while the magnitude of the negative component(s) should be as large as possible. These conditions facilitate the coupling efficiency of the incident wave into the modes supported by the hyperbolic (meta)material, thus leading to a better performance where the coupling is to be maximized. In terms of the constant frequency surfaces (as shown in FIG. 1b), this corresponds to the hyperboloid "degenerating" into two parallel planes.

In another aspect, since the principle of detailed balance implies that good absorbers are also good emitters, the disclosed materials and configuration can also be used for energy emitters as well, where the energy is flowing from the metamaterial to the surrounding medium.

In another aspect, a materials system based on a highly anisotropicmetamaterial, where two components of the permittivity are close to the dielectric constant of the surrounding space, and the third component, in the direction normal to the surface, is much larger, will also function as an efficient energy absorber or emitter. In such system, the surface of constant energy is an ellipsoid with two very large long axes, thus enclosing large phase space volume and supporting a large density of states.

Many practical disorder realizations are adequately described by a Gaussian or a Lorentzian correlation function:

$$C_h(\delta\rho) = h_0^2 \exp(-\delta\rho^2/L^2) \quad (6)$$

$$C_\in(\delta r) = \Delta\in_0^2 \exp(-\delta r^2/L^2) \quad (7)$$

These may be approximated as $$C_h(\delta\rho) = \frac{h_0^2}{1 + \delta\rho^2/L^2} \quad (8)$$

$$C_\epsilon(\delta r) = \frac{\Delta\epsilon_0^2}{1 + \delta r^2/L^2} \quad (9)$$

but other analytic models are also possible and may be used to design the materials. However, the generalized criterion for the efficient performance of the hyperbolic EAMs, remains unchanged.

The correlation function formalism can also be used to describe periodic variations (see FIG. 6b): e.g., for a sinusoidal shape of the surface corrugations:

$$h(x) = h_{max}\sin(x/a) \quad (10)$$

$$C_h(\delta x) = \frac{h_{max}^2}{2}\cos(\delta x/a) \quad (11)$$

so that $h_0 = h_{max}/\sqrt{2}$ and L=a.

In a collaboration with the group of Prof. Noginov at Norfolk State University (Norfolk, Va.) hyperbolic metamaterials were produced so as to demonstrate performance of EAMs at near infra-red wavelengths, based on the present invention. The demonstration hyperbolic metamaterials were fabricated as arrays of 35 nm diameter silver nanowires grown (using an electroplating technique) in 1 cm×1 cm×51 µm anodic alumina membranes. The silver nanowires were oriented perpendicularly to the membrane surface, with a nominal filling factor of silver of about 12%. The fabricated uniaxial metamaterial had hyperbolic dispersion (negative electric permittivity in the direction perpendicular to the membrane surface, $\in_\infty$, and positive electric permittivity in the direction parallel to the membrane, $\in\|$) in the near-infrared spectral range. Dimensioning for other spectral ranges would follow the guidelines presented herein, and the method and apparatus is operable in a practical sense over a wide range of design wavelengths.

Figure 7A:
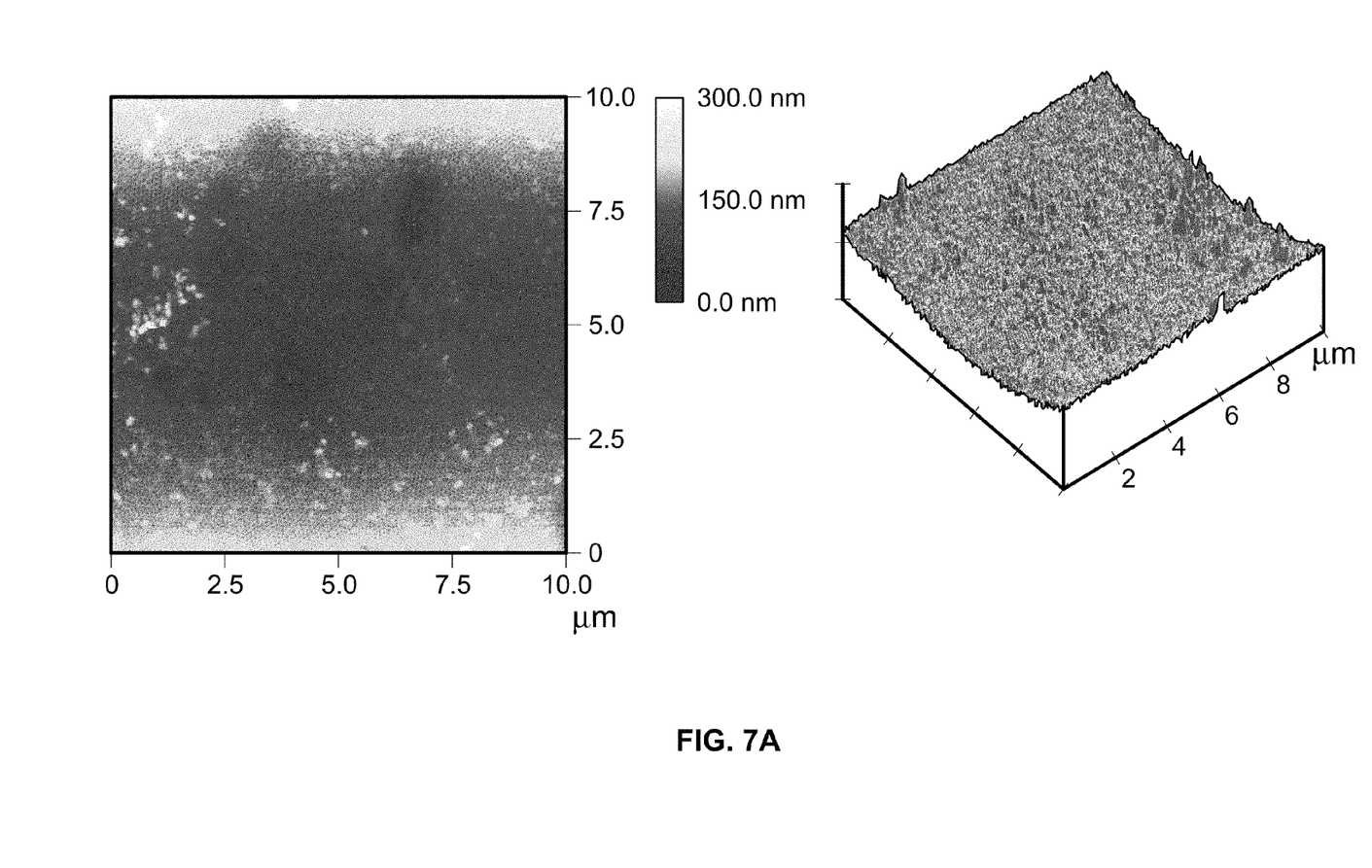

The vertical roughness of an untreated sample was measured with an atomic force microscope (AFM) to be equal to about 40 nm RMS (root-mean-squared) and the lateral correlation length was equal to about 100 nm, (see FIG. 7a).

Figure 7B:
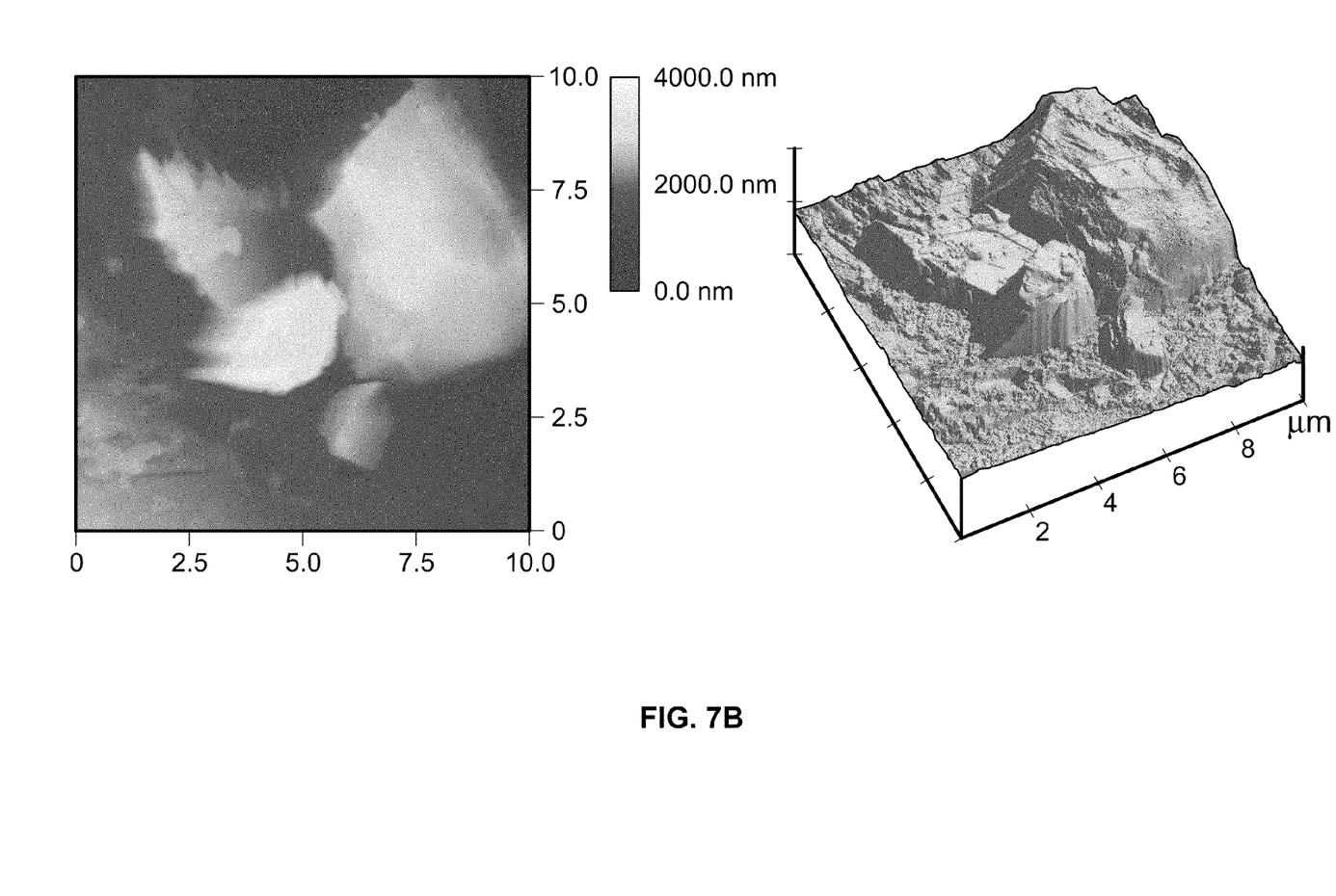
Figure 7C:
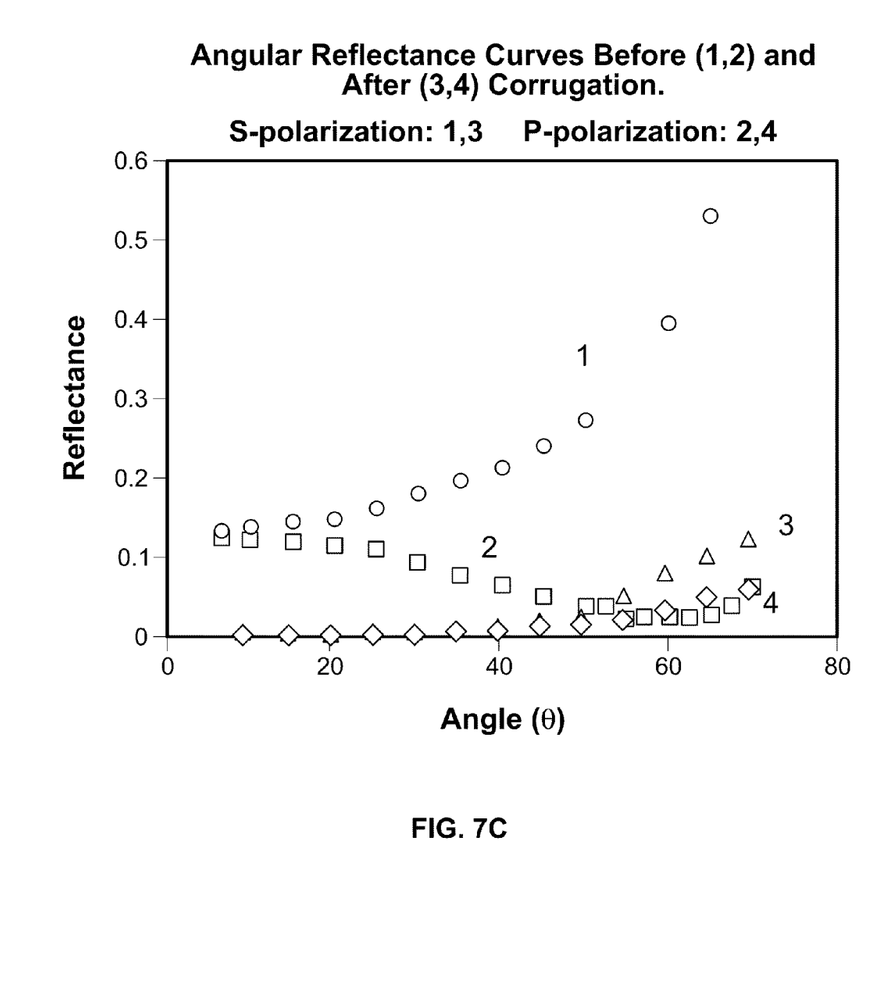

The surface of the original sample was then corrugated by grinding with Al2O3 polishing powder, so that the vertical roughness of the corrugated sample was about 600 nm and the lateral correlation distance was about 1.17 µm (see FIG. 7b). The reflectance measurements were repeated for the corrugated sample, resulting in much smaller intensities of reflected light, particularly at small incidence angles: see FIG. 7c.

As corrugated samples produced not only specular reflection but also diffuse scattering of an incident light, the ratio of the reflected and scattered light intensities was evaluated by measuring the optical signal with a large-aperture detector (1 inch diameter) in the direction of the reflected beam, at different distances from the sample. The most conservative estimate (assuming a Lambertian scattering distribution) has shown that the ratio of scattered and specular light intensities is much smaller than the difference between the reflectance in corrugated and non-corrugated samples.

A theoretical explanation of electromagnetic coupling, reflection and scattering in hyperbolic radiation-absorbing materials generally follows the same approach for disorder induced by both surface corrugations and below-the-interface variations. However, as the derivation is more cumbersome in the former case, so here we will focus on the below-the-surface disorder.

To further simplify the derivation, we will assume that the system is translationally invariant in one of the in-plane directions, thus limiting our attention to the case of the p (also known as TM) polarization. This is a situation of a drastically reduced coupling between the incident waves and the internal propagating modes supported by the hyperbolic metamaterial, as the translational invariance has removed a whole dimension from this interaction. As a result, this theoretical computation underestimates the coupling, and provides an upper bound to the resulting reflection.

For purposes of simplifying the mathematical presentation, but without loss of generality, we assume that the disorder strongly affects only one component of the dielectric tensor of the hyperbolic metamaterial (the general case may be treated along the same lines, but increases the algebraic complexity):

$$\epsilon_z = \epsilon_z(x) \quad (12)$$

where the coordinate z is normal to the surface of the metamaterial, which occupies the z>0 half-space. Using the (y-component of) the magnetic field as the wavefunction, the modes in the hyperbolic metamaterial are defined by $$B(x, z) = u_q(x)\exp(iqz) \quad (13)$$

where $$\frac{d}{dx}\left(\frac{1}{\epsilon_z}\frac{du_q}{dx}\right) + \left(\frac{\omega^2}{c^2} - \frac{q^2}{\epsilon_x}\right)u_q = 0 \quad (14)$$

and normalized by $$\int_0^L u_{q_1}^* u_{q_2} dx = \delta_{q_1 q_2} \quad (15)$$

where the L→∞ is the size of the system, and δ is the Kronecker's symbol. The field inside the metamaterial is then given by:

$$B(x, z) = \sum_q t_q u_q(x)\exp(iqz) \quad (16)$$

while outside the material:

$$B(x, z) = \exp(i(k_0)_x x + i(k_0)_z z) + \sum_p r_p \exp(ipx + ip_z z) \quad (17)$$

where the parameters $t_q$ and $r_p$ have the meaning of the transmission and reflection coefficients.

A straightforward application of the boundary conditions to Maxwell's equations leads to the following equation on the reflection coefficients $r_p$:

$$r_p + \sum_{p'} G_{pp'} r_{p'} = -\delta_{p,(k_0)_x} \quad (18)$$

where the kernel $G_{pp'}$ is defined by $$G_{pp'} = \sum_q \frac{\epsilon_x(k_0)_z}{q - \epsilon_x(k_0)_z}\left(1 + \frac{p'_z}{(k_0)_z}\right)\alpha_p^{(q)}(\alpha_p^{(q)})^* \quad (19)$$

where $p'_z = (\omega^2/c^2 - p'^2)^{1/2}$, and the coefficients $\alpha_p^{(q)}$ are the Fourier components of the mode $u_q$:

$$u_q(x) = \frac{1}{\sqrt{L}}\sum_k \alpha_k^{(q)} \exp(ikx) \quad (20)$$

For the reflection coefficient for the intensity $|r_p|^2$ we then obtain $$|r_p|^2 = \delta_{p,(k_0)_x} - \sum_{p'}(G_{pp'}r_p^* r_{p'} + G_{pp'}^* r_p r_{p'}^*) - \sum G_{pp'}G_{p'p''}^* r_{p'} r_{p''}^*. \quad (21)$$

As the reflection intensity coefficient is a self-averaging quantity, we can apply the ensemble average to (21) over different realizations of the disorder. Using the standard diagonal approximation"

$$<F(\ldots\{\alpha\}\ldots)\cdot R(\ldots\{r\}\ldots)> \approx <F(\ldots\{\alpha\}\ldots)>\cdot<R(\ldots\{r\}\ldots)> \quad (22)$$

for the ensemble-averaged specularly-reflected intensity coefficient in the limit of strong disorder, we obtain:

$$\langle |r_{(k_0)_x}|^2\rangle = \frac{1}{1 + 4(k_0)_z \sum_q \frac{\langle|\alpha_{(k_0)_x}^{(q)}|^2\rangle}{|q/\epsilon_x|}} \quad (23)$$

Here, the information on the statistical properties of the disorder in the system may be represented by Fourier coefficients α of the propagating modes in the hyperbolic metamaterial. An increase in the strength of the disorder will increase the magnitude of $\alpha^{(q)}_{(k0)x}$ for q>>$k_0$, thus leading to a decrease of the reflected intensity, in agreement with the previous discussion, and the experimental data.

Depending on the use to which the material and structure is put, the intent may be to minimize the losses internal to the metamaterial so that the energy is efficiently conducted to or from an underlying structure, which may be for example a photovoltaic element, or to induce loss in the metamaterial so as to absorb a radar signal before it can be reradiated by interacting with an underlying structure. Various methods of introducing loss in a structure are known and may be used, including ordinary lossy materials such as carbon, absorption bands in glass, or the like.

Although only a few examples of this invention have been described in detail above, those skilled in the art will readily appreciate that many modifications are possible without materially departing from the novel teachings and advantages of the invention. Accordingly, all such modifications are intended to be included within the scope of this invention as defined in the following claims.

What is claimed is:

1. A material, comprising:
   an indefinite metamaterial configured to reduce the intensity of surface reflections for a wavelength,
   wherein a substantially planar interface surface of the material has a surface roughness with a characteristic dimension in a first direction perpendicular to the surface, the characteristic dimension substantially equal to the wavelength, and a correlation length L of the roughness in a second direction parallel to the surface is smaller than the wavelength, the correlation length L defined as the solution to the equation $C_h(L)=C_h(0)/e$, where e is 2.7182818, and $C_h$ is defined as $C_h(\delta\rho)=<h(\rho+\delta\rho)h(\rho)>$, where ρ is a two dimensional vector representing position on the surface and h is the height of the surface in the first direction with respect to an average height of the surface in the first direction.

2. The material of claim 1, wherein the surface roughness has a random component.

3. The material of claim 1, wherein the surface roughness has a periodic component.

4. The material of claim 1, wherein the indefinite metamaterial has a permittivity tensor where at least one of the signs of a principal axis component is negative.

5. The material of claim 1, wherein the indefinite metamaterial has a permeability of approximately unity.

6. The material of claim 1, wherein the indefinite metamaterial is uniaxial and a tensor axis having a negative permittivity is substantially orthogonal to the planar interface.

7. The material of claim 1, wherein the metamaterial is comprised of a dielectric material matrix having inclusions of a conductive material.

8. The material of claim 1, wherein the metamaterial is comprised of sub-wavelength thickness layers having differing permittivities, arranged so as to achieve an effective permittivity at the wavelength.

9. The material of claim 1, wherein the metamaterial is comprised of unit cells having scale size substantially less than the wavelength arranged in a repetitive pattern in a layer.

10. The material of claim 9, wherein a spacing between unit cells of the material is substantially less than the wavelength.

11. The material of claim 9, wherein the unit cell is formed of a metal rod in a dielectric material.

12. The material of claim 9, wherein the unit cell is formed of a metal ring in a dielectric material.

13. The material of claim 9, wherein unit cells sized for differing design wavelengths are either interspersed or contained in sub-wavelength thickness layers.

14. The material of claim 1, wherein at least one of a permeability tensor or a permittivity tensor of the metamaterial is hyperbolic at the wavelength.

15. The material of claim 1, wherein a reflection coefficient of the metamaterial with the surface roughness is substantially reduced with respect to a reflection coefficient of a planar surface of the metamaterial at near-normal incidence.

* * * * *